United States Patent Office 3,257,475
Patented June 21, 1966

3,257,475
INTERNALLY CATALYZED HEAT-HARDENING ALKYLOLATED AMIDE INTERPOLYMER CONTAINING UNSATURATED POLYESTER COMPRISING SATURATED POLYCARBOXYLIC ACID
Kazys Sekmakas, Chicago, Ill., assignor to De Soto Chemical Coatings, Inc., Chicago, Ill., a corporation of Delaware
No Drawing. Filed Sept. 24, 1962, Ser. No. 225,871
The portion of the term of the patent subsequent to Dec. 29, 1981, has been disclaimed
17 Claims. (Cl. 260—850)

The present invention relates to heat-hardening solvent-soluble, non-gelled alkylolated acrylamide-containing interpolymers which are internally plasticized and catalyzed for rapid cure while possessing enhanced resistance to overcuring and which further possess improved adhesion to the underlying substrate, especially to a metal surface. The new copolymers or interpolymers in accordance with the invention are especially useful in organic solvent solution coating compositions for the deposit of water insoluble coatings.

Etherified alkylolated acrylamide-containing interpolymers have previously been used in organic solvent solution coating compositions. Unfortunately, when the interpolymer is the sole film-forming component of the coating, it has not been possible to obtain a fully satisfactory combination of properties.

Various difficulties experienced by the art are worthy of note in connection with the present contribution. Thus, some of the previous interpolymers required an external acid catalyst, but the external acid introduces stability problems and pigment flocculation problems. To mitigate these difficulties, the art has introduced from 1-30% by weight of aliphatic ethylenically unsaturated carboxylic acid into the linear interpolymer by addition copolymerization and employed extensive etherification to achieve storage stability. These modifications are helpful to a limited extent, but the internal acid tends to produce brittle films upon overcuring. Moreover, the previous interpolymers, whether including internal acid or not, provide poor adhesion to metal substrates making necessary the inclusion of epoxy resin in the coating composition. Unfortunately, the epoxy resin tends to degrade gloss upon exposure. Also, the previous interpolymers tend to produce either hard and brittle coatings, or flexible and soft coatings. In an effort to provide a more desirable balance of physical properties, the interpolymers have been blended by the art with various other resinous materials. These blends are effective to some extent, but fully satisfactory systems have not been achieved.

As one effort in the direction of blends, etherified alkylolated acrylamide-containing interpolymers have been physically blended with alkyd resins, including oil-modified alkyd resins, in organic solvent solution coating compositions. The alkyd-interpolymer blends known to the art have not been fully compatible, the lack of compatibility and the very existence of a two component system leading to numerous inadequacies.

The present invention is directed to overcoming the foregoing difficulties and, in its preferred aspects, provides a resin system possessing numerous advantages at the same time, these advantages including:
 (1) A rapid curing storage stable system;
 (2) Nonpigment flocculating, resin system;
 (3) Rapid cure with resistance to overcure;
 (4) Good adhesion to metal substrates in the absence of epoxy resin addition;
 (5) Balance of hardness and flexibility; and
 (6) Improved compatibility with other resins in solution.

As will be apparent from the foregoing, the alkylolated acrylamide-containing interpolymers of the invention are desirably used in organic solvent solution coating compositions as the sole film-forming resinous component thereof, but the invention includes the incorporation of other resinous film-forming agents in the coating solution, especially the inclusion of aminoplast resins.

In accordance with the present invention, the acrylamide-containing interpolymers include copolymerized ethylenically unsaturated polyester resin which is carboxyl terminated with saturated carboxylic acid to provide an alkylolated interpolymer product having an acid value (measured on the non-volatile resin solids) of from 4–30, preferably from 8–20, and most preferably from 10–15. Desirably, the acrylamide and unsaturated polyester resin are copolymerized together with at least one other monoethylenically unsaturated monomer (preferably monomers containing the $CH_2=C<$ group) to provide an interpolymer having desired properties.

When the acid value of the interpolymer is significantly less than 4, little effective acid catalysis is achieved. Above an acid value of 30, there is a tendency for films to overcure and become brittle, this tendency increasing with increasing acid value.

Amido hydrogen atoms of the acrylamide component of the interpolymer are replaced by the structure

wherein R is selected from the group consisting of hydrogen, furyl, and saturated lower aliphatic hydrocarbon radicals containing up to 10 carbon atoms, and $R_1$ is selected from the group consisting of hydrogen, and alkyl, alkoxy alkyl, and aryl radicals containing up to 10 carbon atoms in the radical. Preferably, R is hydrogen and $R_1$, to the extent that etherification is desired or permitted, is an alkyl radical containing from 3–8 carbon atoms.

The interpolymers of the invention are desirably produced by a single stage solution copolymerization which is more fully described in my prior copending application Serial No. 100,804, filed April 5, 1961 (now Patent No. 3,163,623), the disclosure of which is hereby incorporated by reference. Thus, organic solvent, aldehyde, unsaturated polyester, an acrylamide and at least one other monoethylenically unsaturated monomer are reacted with one another in the presence of heat and in the presence of a basic catalyst and a free-radical generating polymerization catalyst, and polymerization and alkylolation take place simultaneously. In this way, the alkylolated interpolymer is storage stable, even in the absence of substantial etherification, and the small amount of carboxyl reactivity introduced through the unsaturated polyester provides a very rapid cure. Indeed, the cure rate may even exceed that conventionally obtained with external acid or with 10–20% by weight of unsaturated aliphatic acid, such as acrylic or methacrylic acid, in the conventional extensively butylated methylolated acrylamide interpolymer.

The alkaline catalyst is essential to the single stage reaction, for its absence leads to the production of an insoluble gelled structure which is not useful.

At least 0.1% of alkaline catalyst, based on the weight of monomers being copolymerized, is essential to avoid gelation. On the other hand, it is preferred to use not more than 1.0% of alkaline catalyst because the products so-produced have slow curing properties and are less desirable.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred. The degree of etherification may be changed, and thereby controlled, by changing the amount of alkaline catalyst which is employed.

Accordingly, the preferred interpolymers are produced by a single stage reaction as has been indicated and this provides an interpolymer which is storage stable even in the complete absence of etherification. In order that the preferred stable interpolymers of the invention may be as reactive as possible, it is preferred that if the alkylolated interpolymer is etherified at all, it is etherified to only a minor extent so that at least 25%, preferably at least 50%, and most preferably at least 65% of the alkylol groups are free, e.g., unetherified.

As will be more fully appreciated hereinafter, considerable variation is permissible in the kind and ratio of monoethylenically unsaturated monomers which are used, the aldehyde modifying agent and the etherifying agent. Moreover, there is also a considerable variation which can be made in the specific nature of the carboxyl-terminated copolymerizable unsaturated polyester.

While it is preferred to employ acrylamide in proportions of from 5 to 45%, preferably from 5 to 30% by weight, with unsaturated monomers containing the $CH_2=C<$ group, the invention is not limited to acrylamide nor to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

While the preferred unsaturated monomers interpolymerized with acrylamide do contain the $CH_2=C<$ group and it is preferred to use combinations of the monomers which form hard polymers such as styrene, vinyl toluene and methyl methacrylate with monomers which form soft polymers such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, and stearyl acrylate, the invention is not restricted to the selection of monomers containing the $CH_2=C<$ group or to the selection of preferred combinations of monomers. Thus, monomers which do not contain the $CH_2=C<$ group may be interpolymerized with acrylamide either alone or in the presence of monomers which do contain the $CH_2=C<$ group. Particular attention is directed to maleic acid or fumaric acid diesters, and butene-2 which are useful in the production of interpolymers with acrylamide. Still other monomers which may be used are vinyl chloride, vinyl acetate, 1,3-butadiene and vinyl ethers such as n-butyl vinyl ether, etc.

Numerous ethylenically unsaturated polyesters may be employed for copolymerization in accordance with the invention, it being understood that these polyesters are polyethylenically unsaturated and not monoethylenically unsaturated. The unsaturation can be introduced into the polyester by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used such as allyl alcohol, methallyl alcohol or crotyl alcohol. Unsaturated monocarboxylic acids are illustrated by crotonic acid and by fatty acids containing conjugated unsaturation such as eleostearic acid, licanic acid, or dehydrated castor oil fatty acids, this conjugated unsaturation providing reactive double bonds to enable copolymerization with acrylamide and the other monoethylenically unsaturated monomers which are copolymerized. Incorporation of monocarboxylic acids is facilitated by the use of glycerine in the production of the polyester. When the glycerine polyester is preformed, the mono-acid reacts with the secondary hydroxyl group of the glycerine residue, but, as is known, the polybasic acid, the glycerine and the mono-acid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1) alpha,beta unsaturation; (2) beta,gamma unsaturation; or (3) conjugated unsaturation. Preferably, the unsaturation is in a chain not a part of the linear polyester backbone to thereby reduce the danger of gelation.

Broadly, the unsaturated polyester resin should contain about 0.005 to 0.40 gram mol of ethylenically unsaturated component per 100 grams of polyester. With less reactive polyesters such as those containing the unsaturation in a side chain as by the use of crotonic acid or allyl alcohol, the polyester resin desirably contains from 0.03–0.3 gram mol of unsaturated component per 100 grams of polyester. While the proportion of unsaturated polyester is not of significance, it is broadly desirable to employ from 5–50% of unsaturated polyester resin, based on the total weight of polymerizable materials.

An essential feature of the unsaturated polyester resin in accordance with the invention is the selection of the components of the polyester, their proportions and the extent of polyesterification to provide carboxyl termination, this carboxyl termination being desirably, but not necessarily, achieved by excess carboxyl functionally (more equivalents of carboxyl than hydroxyl). Superimposed upon the requirement for carboxyl termination is the further requirement that there be present in the polyester a saturated polycarboxylic acid so that a portion of carboxyl termination and preferably all of the carboxyl termination is constituted by saturated materials. In this way, when the unsaturated polyester is later used in the formation of an interpolymer, the site of addition copolymerization is remote from the terminal carboxyl groups so that these groups are more available to improve adhesion of the interpolymer to an underlying metal substrate. Apparently, when the carboxyl group is close to the site of copolymerization, the carboxyl group is sterically hindered and the polarity of the carboxyl group is less available for adhesion purposes. Of course, the result of improved adhesion and improved fabrication resistance is achieved in accordance with the invention and there is no intention to be bound by any theoretical aspects, though these may be of interest.

Numerous saturated polycarboxylic acids are well known, the invention preferably employing dicarboxylic acids such as oxalic acid, malonic acid, succinic acid, glutaric acid, adipic acid, pimelic acid, suberic acid, azelaic acid, sebacic acid, phthalic acid, isophthalic acid and terephthalic acid. While dicarboxylic acids are preferred, tricarboxylic acids are also useful such as trimellitic acid. Moreover, and as is well known in alkyd resin production, one may, with equal convenience, employ the anhydride of the acid rather than the acid when the anhydride exists, and the term "polycarboxylic acid" as used herein is intended to include the corresponding anhydrides. Also, and as is well known when the anhydride reacts to form a monoester, this automatically generates the carboxyl group.

As has been indicated, the invention requires the utilization of a saturated polycarboxylic acid. As used herein, the term "saturated" is intended to include aromatic unsaturation as may be present in phthalic acids because the aromatic unsaturation is inert to copolymerization so that the unsaturation is not of any significance.

While the molecular weight of the unsaturated polyester is of secondary significance so long as the polyester is not gelled, it is desirable to employ polyesters which have a viscosity in n-butanol at 80% solids in the range of from C to Z–6, preferably in the range of from V to Z–2 measured on the Gardner-Holdt scale at 25° C.

The proportion of oil which is incorporated in the polyester is of secondary significance in the invention. Indeed, oil may be entirely omitted.

In accordance with the preferred practice, the components of the polyester and the proportion thereof are selected to provide a polyester having an acid value in the range of from 20–150, preferably in the range of from 40–80.

It is preferred, in accordance with the invention, that the carboxyl-terminated polyester resins which have been discussed hereinbefore, be used as the sole component contributing carboxyl functionality to the interpolymer. On the other hand, small amounts of other acids may be present, up to a maximum of 0.6% by weight of the interpolymer, and more preferably up to a maximum of 0.2% by weight of the interpolymer. These other acids are well known to the art and are illustrated by acrylic acid and methacrylic acid. In the same less desiable category is maleic acid or anhydride or fumaric acid in the unsaturated polyester resin.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free-radical generating polymerization catalysts is to well known to require elucidation except to point out that typical catalysts are illustrated in the examples.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, and furfural, or substances yielding an aldehyde, such as paraformaldehyde, hexamethylene tetramine or trioxymethylene can also be used.

Minor etherification of the aldehyde-modified (alkylolated) amide interpolymer may be preferred in some instances, but is not essential. When etherification is employed, lower alcohols containing up to 8 carbon atoms, especially butanol, are preferred. The degree of etherification is easily controlled in accordance with the invention by adjusting the proportion of alkaline catalyst and by controlling the amount of water which is removed.

The particular nature of the organic solvent used for the solution copolymerization or for the solvent solution application of the interpolymers is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxyethanol, 2-butoxyethanol, etc.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with other resins, from a compatible organic solvent solution. These coating solutions may be pigmented or contain dyes, flow control agents, waxes and various other components as will be evident to those skilled in the art.

EXAMPLE 1

Three oil-modified polyester resins are prepared from the following components, all parts being by weight:

|  | Polyester A | Polyester B | Polyester C |
|---|---|---|---|
| Crotonic acid | 250 | 250 | 250 |
| Dehydrated castor oil fatty acids | 790 | 790 | 790 |
| Isophthalic acid | 400 | 440 | 400 |
| Glycerine | 785 | 770 | 770 |
| Resinous polyol (Note 1) | 240 | 240 | 240 |
| Phthalic anhydride | 160 | 160 | 160 |
| Azelaic acid | 255 | 380 | 635 |
| Trimellitic anhydride |  | 124 |  |
| Hydroquinone | 1 | 1 | 1 |

NOTE 1.—The resinous polyol is a technical grade of 1,1'-isopropylidene-bis(p-phenyleneoxy)-di-2-propanol.

Polyesters A, B, and C are produced as indicated below for the production of polyester A.

Polyester A is prepared by charging 250 parts of crotonic acid, 790 parts of dehydrated castor oil fatty acids, 785 parts of glycerine, 400 parts of isophthalic acid and 1 part of hydroquinone into a reactor equipped with an agitator, thermometer, nitrogen inlet tube, Dean-Stark trap and condenser. The mixture is then heated to 420° F. and maintained at this temperature until an acid value of 5 is reached. There are then added to the mixture 240 parts of a resinous polyol, 160 parts of phthalic anhydride, and 255 parts of azelaic acid, and the mixture is maintained at 390° F. to an acid value of 8.0. Butyl alcohol is then added to the product to provide a solution containing 80.3% solids.

The final characteristics of the polyester resins are:

|  | Polyester A | Polyester B | Polyester C |
|---|---|---|---|
| Solids (percent) | 80.3 | 79.1 | 79.2 |
| Viscosity (Gardner) | V | W | U–V |
| Color (Gardner) | 5–6 | 5–6 | 6 |
| Acid value (non-volatile) | 8.0 | 69 | 55 |

As will later more fully appear, polyester resin A has an insufficient acid value to provide an adequate rate of cure, whereas polyester resins B and C with their higher acid value provide interpolymers with a sufficient acid value in accordance with the invention to provide an excellent cure.

EXAMPLE 2

Three acrylamide-polyester interpolymers are prepared using the same procedure. The only variation is the different polyester resins containing different amounts of acid carboxylic groups.

Interpolymer composition: Perecnt
- Acrylamide — 10
- Unsaturated polyester resins A, B and C — 20
- Styrene — 25
- 2-ethyl hexyl acrylate — 10
- Methyl methacrylate — 6
- Ethyl acrylate — 29

Total: 100

Charge Composition: Grams
- Aromatic hydrocarbon solvent (boiling range of 145–195° C.) — 2700
- n-Butyl alcohol — 540
- 40% formaldehyde solution in n-butanol — 405
- 2-ethyl hexyl acrylate — 900
- Acrylamide — 900
- n-Butyl alcohol — 170
- 2-butoxy ethanol — 1935
- 40% formaldehyde solution in n-butanol — 1350
- Ethyl acrylate — 2610
- Styrene — 2250
- Methyl methacrylate — 540
- Unsaturated polyester resins A, B and C of Example 1 — 2250
- Triethyl amine — 27
- Benzoyl peroxide — 18
- Di-tertiary-butyl peroxide — 54
- Azobisbutylronitrile — 54
- Tertiary dodecyl mercaptan — 100
- Cumene-hydroperoxide — 45

*Procedure of polymerization*

The interpolymers are prepared by charging into a reactor equipped with an agitator, condenser, Dean-Stark trap, thermometer and nitrogen inlet tube, 2700 grams of aromatic hydrocarbon solvent (boiling range of 145–195° C.), 540 grams of butanol and 405 grams of 40% formaldehyde solution in n-butanol.

The initial charge is heated to reflux temperature (235–240° F.). Then dissolve 900 grams of acrylamide in 1170 grams of butanol, 1935 grams of 2-butoxy ethanol and 1350 grams of 40% formaldehyde solution in n-butanol. Add to this monomer blend the remaining monomers and catalysts and the 2250 grams of unsaturated polyester resin.

The above monomer-catalyst-formaldehyde blend is added to the reactor over a 2½ hour period of time and the mixture is maintained at 240–245° F. while concomitantly removing water by azeotropic distillation, the water being collected in the Dean-Stark trap.

The resulting interpolymers have the following physical characteristics:

|  | Interpolymer I with Polyester A (Acid Value 8.0) | Interpolymer II with Polyester B (Acid Value 69) | Interpolymer III with Polyester C (Acid Value 55) |
|---|---|---|---|
| Solids (percent) | 54.1 | 54.5 | 54.6 |
| Color (Gardner) | 1–2 | 1–2 | 1–2 |
| Viscosity (Gardner) | V–W | V–W | W |
| Acid value of finished interpolymer (non-volatile) | 2 | 15 | 12 |

Polyester-acrylamide Interpolymers I, II and III are each formulated into identical gloss enamels consisting of 32% non-volatile resin and 28% of titanium dioxide. Interpolymers I, II, and III are also formulated to provide identical flat enamels, each consisting of:

Percent
- Pigment — 41.2
- Titanium dioxide — 63.7
- Talc — 26.6
- Finely divided silica (flatting agent) — 9.7
- Non-volatile resin — 20.2

Various physical tests are made on each enamel. In each test, it is found that the enamels containing Interpolymers II and III (containing higher acid values) cure to provide films which are as hard and more flexible on reverse impact and 2T bend than are films provided by conventional interpolymers.

Panels are prepared using the gloss enamels and are reverse bumped at 20, 30 and 40 inch pounds and bent at 180 degree to 2T bend. The panels are placed in a 130° F. oven overnight for dry heat evaluation. The results showed severe cracking and opening of bump and bend in the panel coated with the enamel containing Interpolymer I (low carboxylic value). The panels coated with the enamels containing Interpolymers II and III (containing higher acid values) showed no cracking or opening in the bump, indicating that these films are cured much better, and have better flexibility.

The enamels are applied on treated aluminum panels using a #40 wire wound rod and baked at a temperature of 475° F. for a period of 45, 50 and 55 seconds in a gas fired oven. The baking times are varied to provide a range of cure in the critical short time curing range.

In each instance, the enamels containing Interpolymers II and III (with higher amount of carboxylic acid groups) cured much faster than the enamels containing Interpolymer I (with low carboxyl value).

The viscosities of the gloss enamels are checked initially and after four days to determine if an excess of acid carboxylic groups will cause instability. No major viscosity increases are noticed in any of the enamels.

To determine if the interpolymers containing free acid carboxylic groups can cause poor dry heat aging characteristics in high gloss enamels, panels of the enamels are impacted, bent and exposed to dry heat (130° F.) for 16 hours. While there was no change in the panels coated with the enamels containing Interpolymers II and III, the film of Interpolymer I exhibited severe cracking and opening at bump and bend, still further illustrating the improvement obtained when interpolymers of preferred acid value are used.

To still further evaluate enamels formulated from the interpolymers of the invention, a chill bump test (46° F.) is carried out. Films prepared containing Interpolymer I cracked severely when bumped at 20, 30 and 40 inch pounds, while the films of Interpolymers II and III remained intact.

A cure study of the flat enamels containing Interpolymers I–III is evaluated at baking times of one minute at 500° F. and one minute at 450° F. The baked panels are rubbed with toluol to note the time required to reach base metal and thereby determine the degree of cure. There was no difference in the cured films baked for one minute at 500° F., e.g., all three interpolymers are fully cured. By baking for one minute at 450° F., it is found that Interpolymers II and III cured very well, but that the Interpolymer I film was uncured. Moreover, Interpolymers II and III cured well even by baking for 50 seconds at 450° F.

The following physical properties are obtained when films of the flat enamels are baked for 60 seconds at 500° F.

|  | Interpolymer I | Interpolymer II | Interpolymer III |
| --- | --- | --- | --- |
| Gloss Reading (60° Photovolt) | 10 | 10 | 9. |
| Mar Resistance | Good | Excellent | Excellent. |
| Reverse impact | Fair | do | Very Good. |
| Toluol Resistance [1] | 60 | 60 | 60. |
| Pencil Hardness | HB | F | F. |

[1] Solvent resistance is evaluated by using toluol rubs and timing the number of seconds which elapse before bare metal shows through. The test is terminated after sixty seconds of rubbing. A panel having 60 or more toluol rubs is considered to be fully cured.

The improved adhesion in flat enamels using Interpolymers II and III is evident from the preceding table. This improved adhesion in accordance with the invention is obtained for gloss enamels as well as flat enamels as is illustrated in the table which follows:

|  | Interpolymer I | Interpolymer II | Interpolymer III |
| --- | --- | --- | --- |
| Gloss Reading (60° Photovolt) | 95 | 91 | 98. |
| Mar Resistance | Fair | Good | Good. |
| Reverse Impact | do | Excellent | Very Good. |
| 2T Bend | do | Very Good | Do. |
| Pencil Hardness | HB | F | F. |

The 2T bend test procedure referred to in the foregoing examples, is carried out as follows:

The coated panels with the coating on the outside of the panel are bent 180° (U bend) by dies through a bend which has a radius equal to one metal thickness.

The invention is defined in the claims which follow.

I claim:

1. A storage stable and internally catalyzed heat-hardening solvent-soluble non-gelled product produced by the addition interpolymerization of (A) a monoamide of an ethylenically unsaturated monocarboxylic acid, and (B) polymerizable unsaturated material comprising unsaturated carboxyl-terminated polyester resin, said polyester resin being formed by the polyesterification of components comprising saturated polycarboxylic acid and said carboxyl termination consisting essentially of said saturated polycarboxylic acid incorporated in said polyester resin, amido hydrogen atoms of said interpolymer being replaced by the structure

in which R is selected from the group consisting of hydrogen, furyl, and saturated lower aliphatic hydrocarbon radicals containing up to 10 carbon atoms and $R_1$ is selected from the group consisting of hydrogen, and alkyl, alkoxy alkyl, and aryl radicals containing up to 10 carbon atoms in the radical, and said carboxyl-terminated polyester resin providing said interpolymer with an acid value of from 4 to 30.

2. An interpolymer as recited in claim 1 in which said amide is an acrylamide and said component (B) further comprises monomer having the $CH_2=C<$ group.

3. An interpolymer as recited in claim 2 in which the amido groups of the acrylamide component of said interpolymer are reacted with formaldehyde.

4. An interpolymer as recited in claim 1 in which said saturated polycarboxylic acid is an aliphatic dicarboxylic acid.

5. An interpolymer as recited in claim 1 in which said polyester has an acid value of from 20–150.

6. An interpolymer as recited in claim 1 in which said unsaturated polyester resin contains about 0.005 to 0.40 gram mol of ethylenically unsaturated component per 100 grams of polyester.

7. An interpolymer as recited in claim 1 in which said amido hydrogen atoms are reacted with formaldehyde to form methylol groups and said methylol groups are etherified with an alkanol containing from 3–8 carbon atoms, said methylol groups remaining unetherified to an extent of at least 25%.

8. A storage stable and internally catalyzed heat-hardening solvent-soluble non-gelled product produced by the addition interpolymerization of (A) an acrylamide, and (B) polymerizable unsaturated material comprising unsaturated carboxyl-terminated polyester resin, said polyester resin being formed by the polyesterification of components comprising saturated polycarboxylic acid, said polyester resin having an acid value of from 20–150, and said carboxyl termination consisting essentially of said saturated polycarboxylic acid incorporated in said polyester resin, said interpolymer being reacted with aldehyde in the presence of alkaline material to replace amido hydrogen atoms by the structure

in which R is selected from the group consisting of hydrogen, furyl, and saturated lower aliphatic hydrocarbon radicals containing up to 10 carbon atoms and $R_1$ is selected from the group consisting of hydrogen, and alkyl, alkoxy alkyl and aryl radicals containing up to 10 carbon atoms in the radical, and said carboxyl-terminated polyester resin providing said interpolymer with an acid value of from 4 to 30.

9. An interpolymer as recited in claim 8 in which said amido hydrogen atoms are reacted with formaldehyde to form methylol groups, and said methylol groups are unetherified to an extent of at least 50%.

10. An interpolymer as recited in claim 8 in which said unsaturated polyester resin comprises from 0.005 to 0.40 gram mol of ethylenically unsaturated mono-functional component per 100 grams of polyester.

11. An interpolymer as recited in claim 8 in which said component (A) is acrylamide present in an amount of from 5–40% of total polymerizable material.

12. An interpolymer as recited in claim 8 in which said interpolymer has an acid value of from 8–20.

13. An interpolymer as recited in claim 8 in which said polyester has a viscosity in n-butanol at 80% solids in the range of from C to Z–6 measured on the Gardner-Holdt scale at 25° C.

14. A storage stable and internally catalyzed heat-hardening solvent-soluble non-gelled product produced by the addition interpolymerization of (A) acrylamide in an amount of from 5–30% of total polymerizable material; (B) polymerizable ethylenically unsaturated material comprising monomer containing the $CH_2=C<$ group and ethylenically unsaturated carboxyl-terminated polyester resin said polyester resin being formed by the polyesterification of components comprising saturated polycarboxylic acid, said polyester resin having an acid value of from 20–150, and said carboxyl termination consisting essentially of said saturated polycarboxylic acid incorporated in said polyester resin, said interpolymer being reacted with formaldehyde in the presence of from 0.1–1.0% of alkaline catalyst to replace amido hydrogen atoms with methylol groups, said methylol groups being etherified with a $C_3$–$C_8$ alkanol to an extent of from 0–35%, and said carboxyl-terminated polyester resin providing said interpolymer with an acid value of from 8–20.

15. An interpolymer as recited in claim 14 in which about one amido hydrogen atom in each acrylamide group is converted to a methylol group.

16. A storage stable, heat-hardening coating composition comprising organic solvent containing dispersed pigment and having dissolved therein an internally catalyzed heat-hardening solvent-soluble non-gelled product produced by the addition interpolymerization of (A) a monoamide of an ethylenically unsaturated monocarboxylic acid, and (B) polymerizable unsaturated material comprising unsaturated carboxyl-terminated polyester resin, said polyester resin being formed by the polyesterification of components comprising saturated polycarboxylic acid and said carboxyl termination consisting essentially of said saturated polycarboxylic acid incorporated in said polyester resin, amido hydrogen atoms of said interpolymer being replaced by the structure $$-\overset{R}{\underset{|}{C}}HOR_1$$

in which R is selected from the group consisting of hydrogen, furyl, and saturated lower aliphatic hydrocarbon radicals containing up to 10 carbon atoms and $R_1$ is selected from the group consisting of hydrogen, and alkyl, alkoxy alkyl and aryl radicals containing up to 10 carbon atoms in the radical, and said carboxyl-terminated polyester resin providing said interpolymer with an acid value of from 4 to 30.

17. An article having a metal surface having as a coating thereon a hardened resinous composition of claim 1.

References Cited by the Examiner

UNITED STATES PATENTS

| | | | |
|---|---|---|---|
| 2,940,945 | 4/1961 | Christenson et al. | 260—21 |
| 3,118,853 | 1/1964 | Hart et al. | 260—850 |
| 3,163,615 | 12/1964 | Sekmakas | 260—22 |

MURRAY TILLMAN, *Primary Examiner.*

J. T. GOOLKASIAN, *Assistant Examiner.*